United States Patent [19]

Pobgee

[11] 3,885,097

[45] May 20, 1975

[54] GRAPHICAL INPUT APPARATUS FOR ELECTRICAL APPARATUS

[75] Inventor: Peter John Pobgee, Surbiton, England

[73] Assignee: National Research Development Corporation, London, England

[22] Filed: Aug. 11, 1972

[21] Appl. No.: 279,774

[52] U.S. Cl. .................................................. 178/18

[51] Int. Cl. .............................................. G08c 21/00

[58] Field of Search ............ 178/18, 19, 20, 21, 87; 1/19; 33/1 M; 35/9 C; 340/146.3 E, 146.3 SY; 346/139 C

[56] References Cited

UNITED STATES PATENTS

| | | | |
|---|---|---|---|
| 2,704,305 | 3/1955 | McLaughlin et al. | 173/18 |
| 2,907,824 | 10/1959 | Peek, Jr. | 178/18 |
| 2,975,235 | 3/1961 | Leitner et al. | 178/18 |
| 3,286,028 | 11/1966 | Gray et al. | 178/18 |
| 3,308,253 | 3/1967 | Krakinowski | 200/86 R |
| 3,522,664 | 8/1970 | Lambright et al. | 178/18 |
| 3,632,874 | 1/1972 | Malavard et al. | 178/18 |
| 3,654,389 | 4/1972 | Pole | 178/18 |
| 3,798,370 | 3/1974 | Hurst | 178/18 |

*Primary Examiner*—Thomas A. Robinson
*Attorney, Agent, or Firm*—Cushman, Darby & Cushman

[57] ABSTRACT

A graphical input device for electrical apparatus such as a computer or a cathode ray tube display is described. The device comprises two spaced apart sheets of resistive material one over the other and includes means for applying voltage alternately to the two sheets between electrodes along opposite edges thereof. A stylus is used to write or draw on the top sheet and in so doing it is deformed to contact the lower sheet. When a sheet is not connected to the applied voltage, it is used to pick off a voltage corresponding to one co-ordinate of the point of contact. The voltage is applied in directions which are at right angles to one another in the two sheets so that the X and Y co-ordinates of the point of contact are provided alternately. In order to suppress lines in a display which would occur between consecutive points when the stylus was lifted, a contact detector is provided to suppress co-ordinates produced under these conditions. To overcome the extraneous contacts which occur when an operator rests his hand on the top sheet, a separator such as an insulating mesh is positioned between the sheets.

24 Claims, 9 Drawing Figures

GRAPHICAL INPUT APPARATUS FOR ELECTRICAL APPARATUS

Figure 1A:
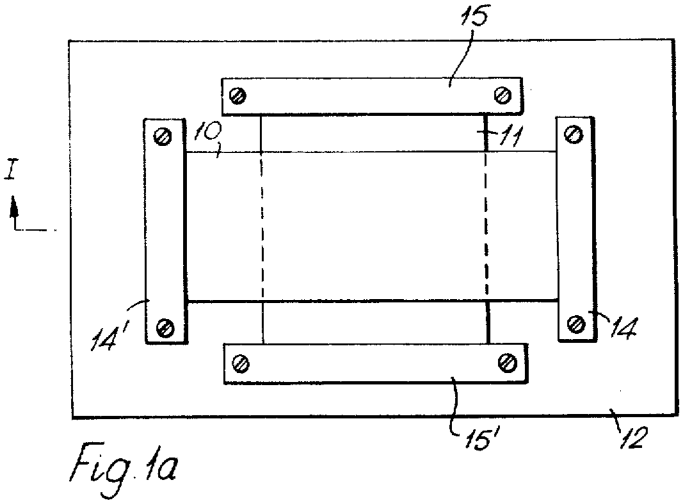

The present invention relates to the determination of the co-ordinates of a point indicated, for example, by using a stylus, on a surface. The invention is particularly, but not exclusively, useful as an input device for a computer or for telegraphic apparatus where the input is to be in the form of writing, charts, graphs or drawings.

Existing methods of entering information into a computer or telegraphic apparatus impose constraints on the means used to indicate the positions of the points whose co-ordinates are required. Physical connections have to be made to these means, and a field, set up over the writing surface to enable the point to be located, is usually non-linear, since it is distorted near the edge of the surface, or distorted when the point is sensed.

According to the present invention there is provided apparatus for obtaining the co-ordinates of a point indicated on a surface, including a sheet of electrically resistive material held parallel and adjacent to, but not in contact with the planar surface of an electrically resistive member, the sheet being sufficiently resilient to deform temporarily and make contact with the planar surface over a relatively small area, when pressed by means for indicating the position of a point, change-over means for coupling current-supply means to pass a current in a substantially single direction through the sheet, and for coupling measuring means to the resistive member, and for subsequently coupling the current-supply means to pass a current in a substantially single direction, at an angle to the other current direction, through the resistive member, and for coupling the measuring means to the sheet, the measuring means being so adapted to measure voltage when the sheet and the member are in contact at the said area that the voltages at the area due to the said currents are provided one after another, and suppression means for detecting good contact between the sheet and the member and for suppressing the output of the apparatus unless a good contact exists.

These voltages are proportional to the co-ordinates of the point indicated with respect to axes parallel to the current directions. The angle between the current directions is preferably 90°.

Preferably, means are positioned between the sheet and the planar surface to prevent contact between the sheet and the surface over relatively large areas.

The resistive sheet may be made of resistive material or it may be a resistive layer on a sheet of resilient material. Similarly the resistive member may include a resistive layer.

The resistive sheet may be made for example of carbon-loaded plastic or glass cloth covered with conducting silicone rubber, and the resistive member may for example be a sheet of Teledeltos paper, or a palladium-silver cermet, that is, palladium-silver/glass deposited on an alumina substrate and then fired.

The apparatus according to the invention overcomes the disadvantage of having to provide physical connections and largely overcomes the distortion problem. The apparatus is suitable for use as a computer input where the input is to be in the form of handwriting.

The change-over means may include first and second change-over switches, each having a common terminal, and first and second terminals either of which can be connected to the common terminal. The common terminals of the switches are connected to the terminals of a d.c. source, the sheett is connected between the first terminals of the switches, and the resistive member is connected between the second terminals of the switches.

Instead the change-over means may include means for applying an alternating current to a first series circuit comprising the sheet and first rectifier means, and a second series circuit comprising the member and second rectifier means, the first and second rectifier means being oppositely poled with the result that the sheet and the member pass current for alternate half cycles of the alternating current.

The measuring means are preferably first and second peak detector circuits which are connected to the sheet and the member, respectively.

Where the current supply means includes means for applying a.c., the rectifier circuits may together employ a pair of transistors or field effect transistors, of opposite conductivity, the base or gate of one of the transistors being coupled to the sheet, and the base or gate of the other transistor being coupled to the member.

Figure 1B:
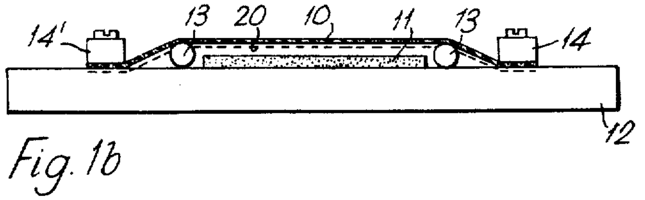
Figures 2, 3:
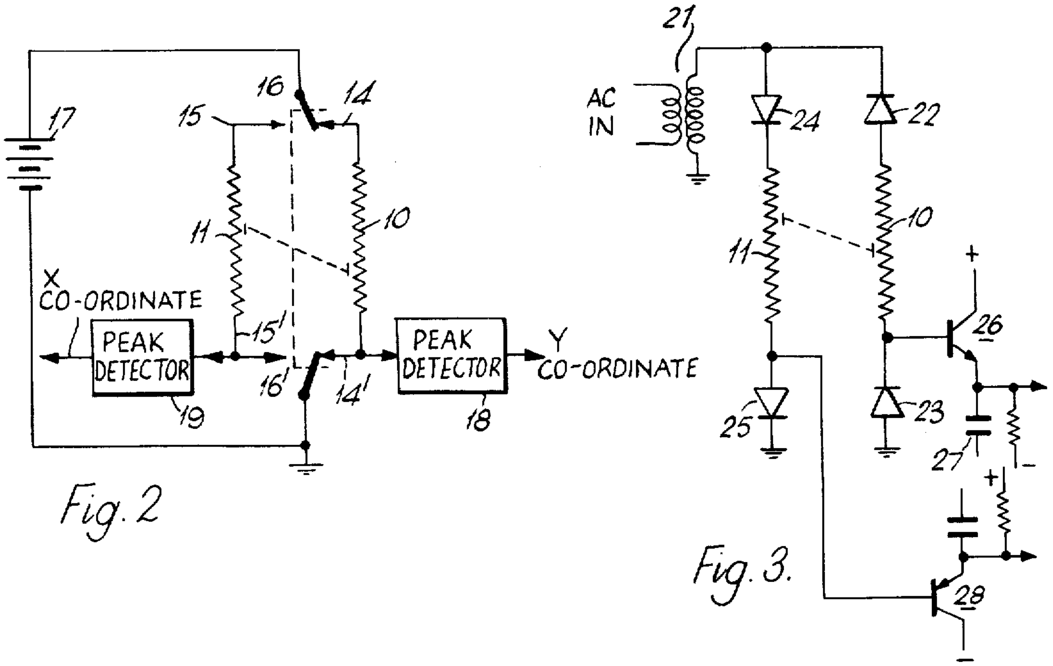
Figure 4:
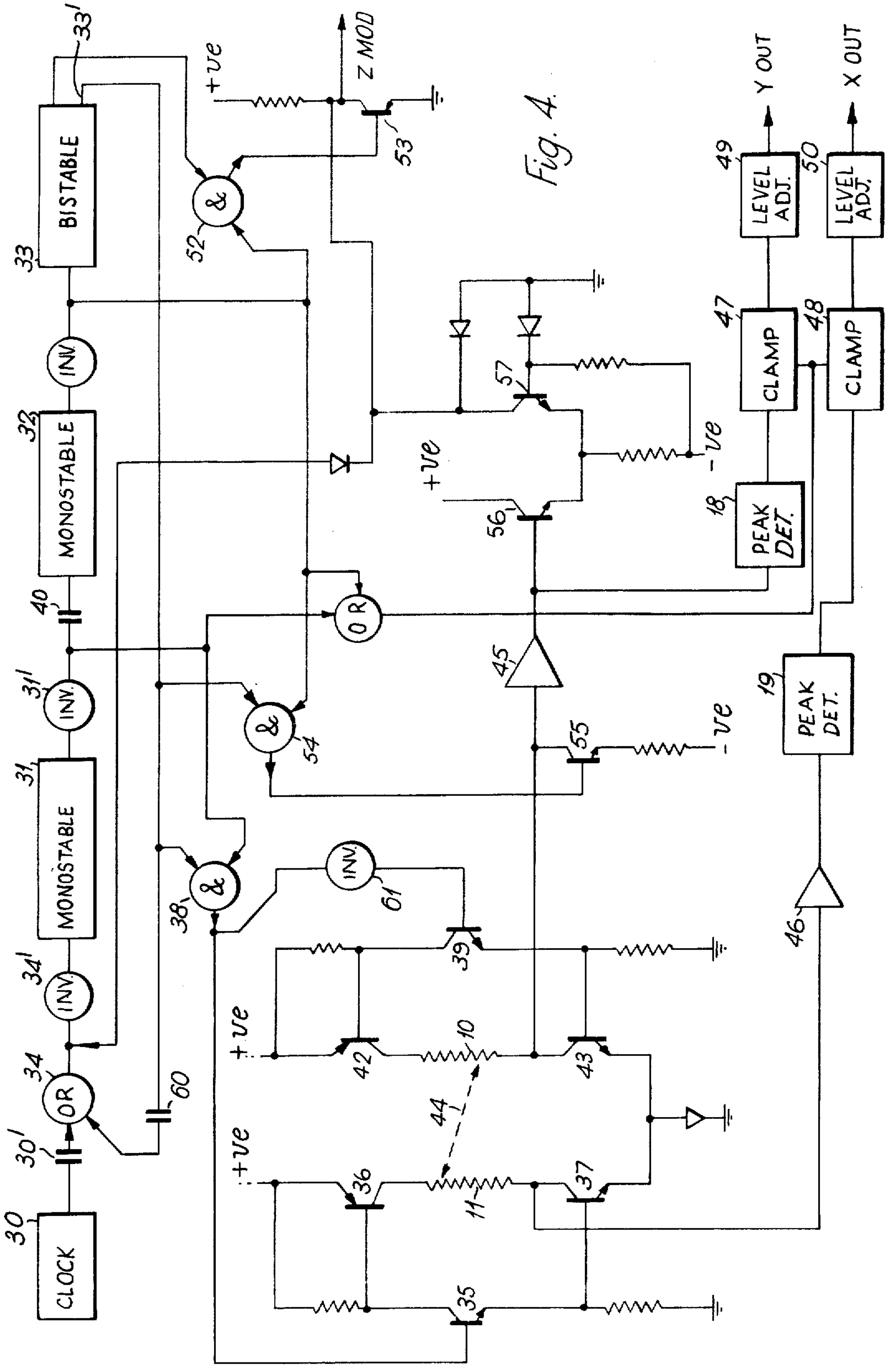
Figure 5:
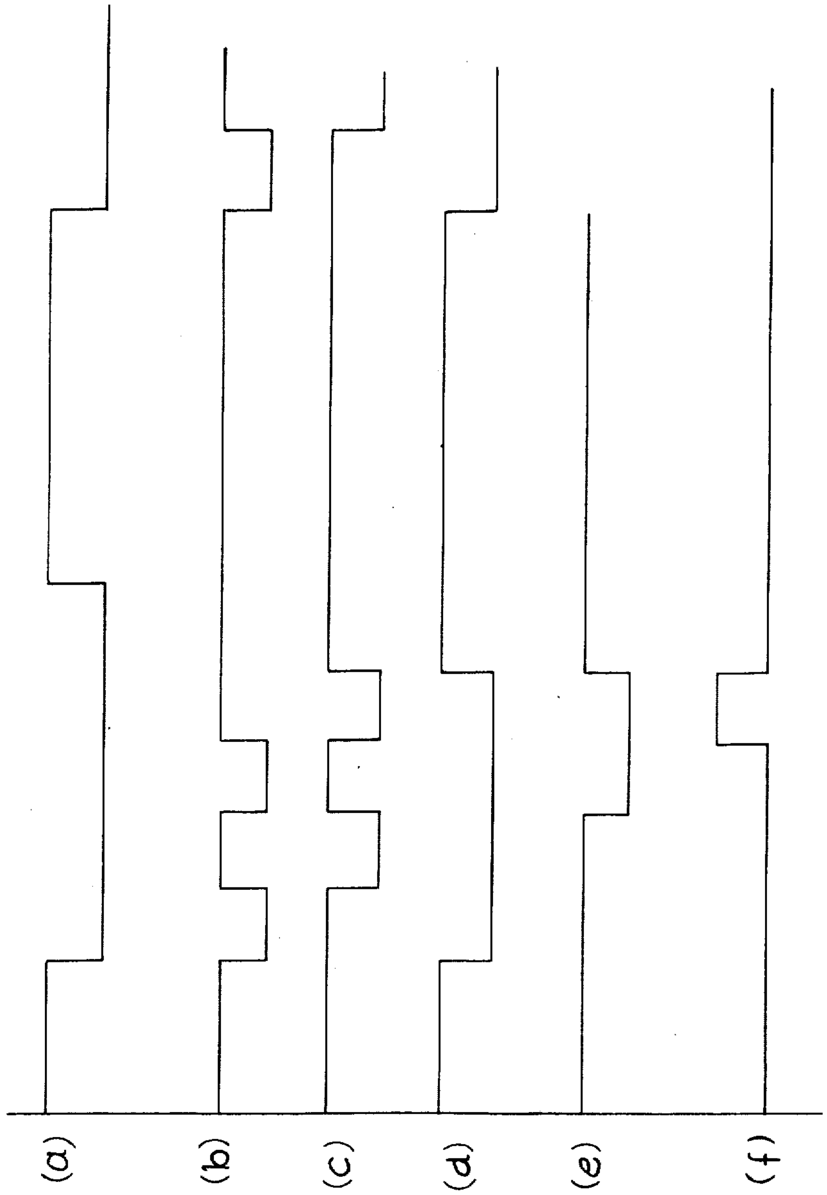
Figures 6, 7:
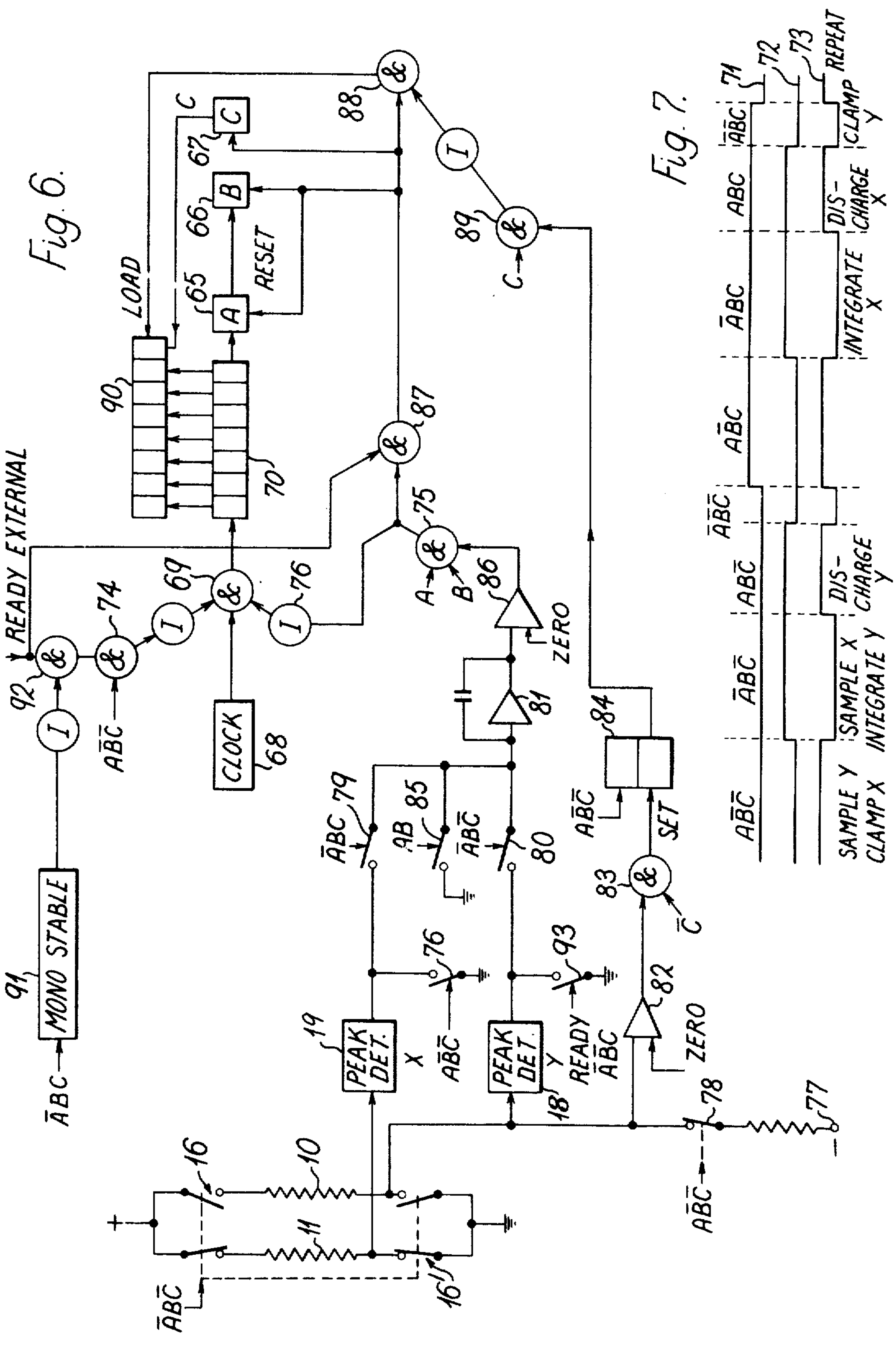
Figure 8:
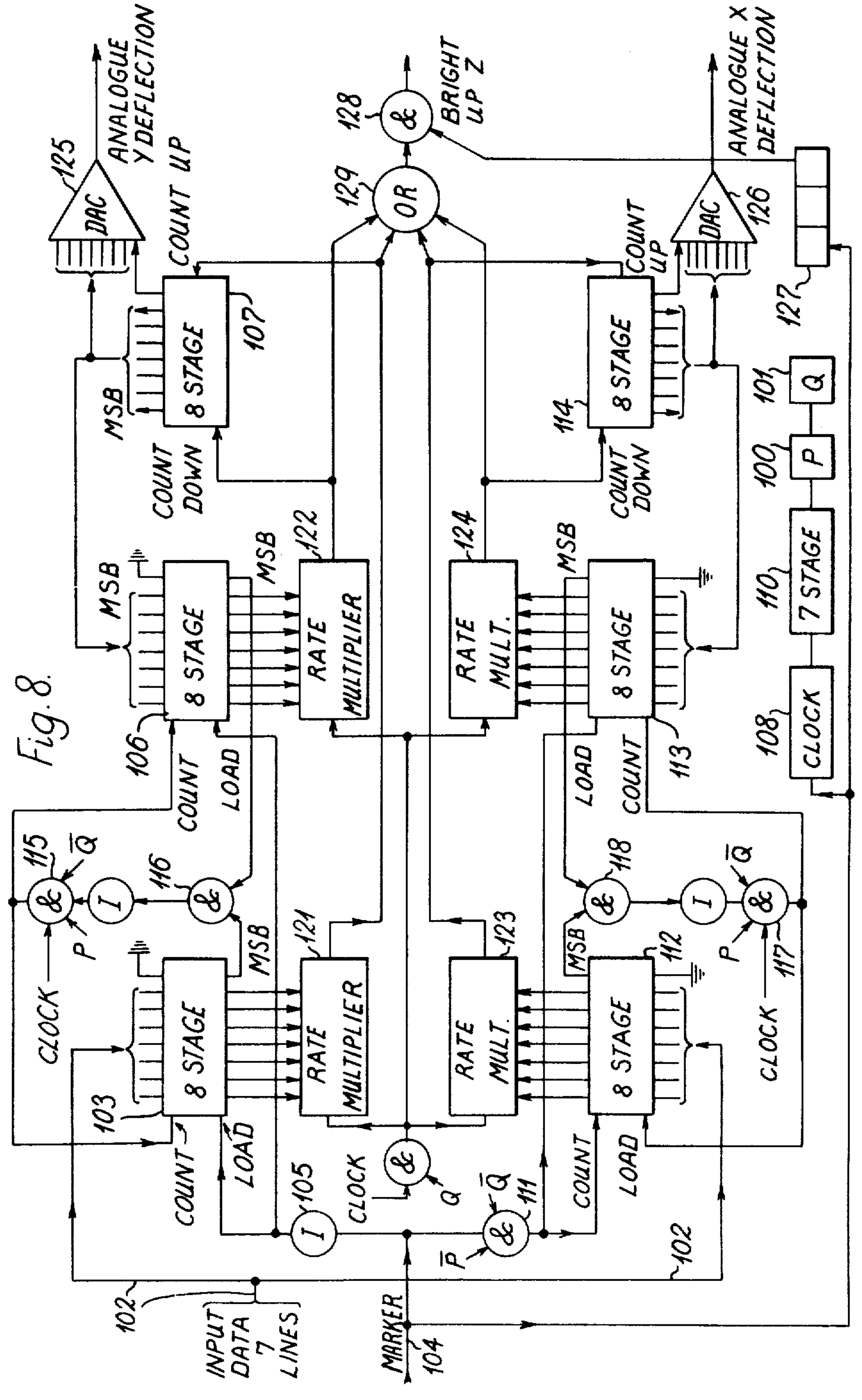

Certain embodiments of the invention will now be described, by way of example, with reference to the accompanying drawings, in which:

FIG. 1(*a*) is a plan view of part of a first embodiment of apparatus according to the present invention, FIG. 1(*b*) is a cross-section along the line I — I in FIG. 1(*a*), FIG. 2 is a circuit diagram of a first embodiment of apparatus according to the present invention, FIG. 3 is a circuit diagram of a second embodiment of apparatus according to the present invention, FIG. 4 is a part-circuit part-block diagram of a third embodiment of apparatus according to the invention, FIG. 5 shows waveforms used in explaining the operation of the apparatus of FIG. 4, FIG. 6 is a block diagram of a fourth embodiment of the invention providing co-ordinates in the form of a digital output, FIG. 7 is a diagram of waveforms occurring in the fourth embodiment, and FIG. 8 is a block diagram of a circuit for use with the circuit of FIG. 6 in providing a display.

In FIGS. 1(*a*) and (*b*) a uniform resilient sheet of resistance material is stretched across slab 11 of resistance material which is mounted on an insulating base 12. The sheet 10 is supported by fixed longitudinal brass rollers 13 and held along one side under blocks of conducting material 14 and 14'. Where it is in contact with the rollers, it is coated with silver paint to reduce contact resistance. The slab 11 is connected to blocks of conducting material 15 and 15'.

The blocks 14 and 14' are each connected to one contact of the change-over switches 16 and 16' respectively. The common contact of the switch 16 is connected to the positive terminal of a battery 17, and the common contact of the switch 16' is connected to the negative terminal of the battery. The conducting blocks 15 and 15' are connected to the other contacts of the switches 16 and 16' respectively. Hence when the switches 16 and 16' are in one position a current is passed through the flexible sheet 10 and when the switches are in their other position a current is passed through the slab 11.

A peak detector circuit 18 is connected to the sheet 10, and a further peak detector circuit 19 is connected to the slab 11.

When the co-ordinates of a point are to be generated, a stylus is used to press the sheet 10 on to the slab 11 at the point. With the switches 16 and 16' in the position shown in FIG. 2 the sheet 10 acts as a potentiometer. The peak detector circuit 19 is of high input impedance and thus draws very little current. Hence the whole of the slab 11 is substantially at the voltage of the point of contact with the sheet 10 and the peak detector circuit 19 receives this voltage as its input signal. Therefore the voltage applied to the peak detector circuit 19 is proportional to the position of the point between the slabs 14 and 14'. The contacts of the switches 16 and 16' are now changed over so that the sheet 10 and the slab 11 change roles, with the slab 11 now acting as the potentiometer. Thus the position of the point is indicated by the output voltage from the peak detector circuit 18, and since the currents in the sheet 10 and the slab 11 are orthogonal the successive output from the detector circuits 18 and 19 can be considered as the Y and X co-ordinates of the point.

In using the sheets to generate a display a person holding a stylus is likely to place his hand on the sheets and thus cause spurious co-ordinates to be generated. This is avoided by the insertion of a mechanical separator 20 between the sheet 10 and the slab 11. The separator may be woven nylon cloth or an insulating mesh which allows a point formed in the sheet 10 when pressed by a stylus to penetrate and make contact with the slab 11, but does not allow contact between the sheet and the slab when a hand or similar object with a large area of contact rests on the sheet.

Another problem is that unless the co-ordinates are suppressed when the stylus is out of contact with the sheet 10, for example between writing the initials of a signature, false co-ordinates will be generated representing a line joining positions corresponding to consecutive points of contact. Additionally a high resistance contact will distort the co-ordinate measurements. Suppression is achieved by the provision of means (not shown in FIGS. 2 and 3) for determining whether a good contact exists between the sheet 10 and the slab 11 and for suppressing the co-ordinates if not. The solution to the problem is described in more detail in connection with FIG. 4.

A further embodiment is shown in FIG. 3 where a transformer 21 connected to an a.c. supply (not shown) feeds currents to the sheet 10 and the slab 11 by way of series diodes 22 and 23, and 24 and 25 respectively, the diodes 22 and 23 being oppositely poled to the diodes 24 and 25. The sheet 10 is coupled to the base of a transistor 26, which, with a capacitor 27, acts as the high input impedance peak detector circuit 18. Similarly, the slab 11 is connected to the base of a transistor 28 in the peak detector circuit 19.

In this arrangement the a.c. supply is rectified and unidirectional current flows alternately in the sheet 10 and the resistor 11. When a point is indicated by pressing the sheet 10 onto the slab 11, voltages proportional to its co-ordinates appear at the outputs of the circuits 18 and 19.

Where an analogue output is required which is suitable for application for example to a storage oscilloscope, the arrangement of FIG. 4 may be used. The gates shown in this figure are enabled by positive input signals, and their output signals are inverted with respect to their input signals.

The operation of the circuit is under the control of clock pulses shown in FIG. 5(*a*) from a clock pulse generator 30. Other control waveforms are generated by monostable circuits 31 and 32 and shown in FIGS. 5(*b*) and 5(*c*). The trailing edge of each clock pulse applied to a capacitor 30' generates a pulse which opens an OR gate 34 and then, by way of an inverter 34' causes the monostable circuit 31 to enter its quasi-stable state. The monostable circuit 32 is connected to the output of the circuit 31 by way of an inverter 31' and a capacitor 40. On the return of the circuit 31 to its stable state the capacitor 40 generates a pulse causing the circuit 32 to enter its quasi-stable state. When the circuit 32 returns to its stable state, the bistable circuit 33 changes from one state to another, and in doing so generates a pulse in a capacitor 60 connected between the OR gate 34 and the inverted output 33' of the bistable circuit. The waveform at the inverted output 33' is shown in FIG. 5(*e*) and the other output waveform of the circuit 33 is an inversion of that shown in this figure. The OR gate 34 opens and the monostable circuits 31 and 32 again in turn take up their quasi-stable states and return to their stable states setting the bistable circuit 33 back to its original state. The circuits 31, 32 and 33 do not change state again until the occurrence of the trailing edge of the next clock pulse.

In FIG. 4 current is passed through the resistive slab 11 when the waveform of FIG. 5(*b*) is positive since at this time transistors 35, 36' and 37 conduct. When the monostable circuit 31 is in its quasi-stable state and the bistable circuit 33 is in its first state, an AND gate 38 opens, switching on a transistor 39 by way of an inverter 61, and switching off the transistor 35. Current now passes through the sheet 10 by way of transistors 42 and 43. If a stylus causes the sheet 10 to contact the slab 11 at one point as indicated by the dashed line 44, a voltage corresponding to the X co-ordinate of the point of contact is stored by a capacitor in the peak detector 19 connected to the slab 11 through a high input impedance amplifier 46.

When the monostable circuit 32 enters its quasi-stable state the AND gate 38 closes and current passes through the slab 11 again since the transistors 35, 36' and 37 conduct in this condition. A voltage corresponding to the Y co-ordinate of the point of contact is now stored by a capacitor in the peak detector 18, connected to the sheet 10 by way of an amplifier 45.

The outputs of the peak detector circuits 18 and 19 pass through clamp circuits 47 and 48 to level-adjustment circuits 49 and 50 which provide suitable voltage levels for application to the Y and X plates of a storage oscilloscope. The clamp circuits short circuit the capacitors of the peak detector circuits unless either the monostable circuits 31 or the monostable circuit 32 is in its quasi-stable state, see FIG. 5(*d*) where the clamp voltage waveform is shown. Thus at the end of each double cycle of the circuits 31 and 32 when the bistable circuit 33 returns to its first state, the capacitors are discharged and are ready for new co-ordinates.

When the circuits 31 and 32 are in their quasi-stable states for the second time in each cycle of operation, the AND gate 38 does not open since the inverted output from the circuit 33 is negative. Thus current continues to pass through the slab 11 and is not switched to the sheet 10.

In order to achieve suppression of the display when the stylus is out of contact with the sheet 10, an indication is given when the sheet 10 and the slab 11 are in contact and brightening the oscilloscope trace occurs only in certain intervals when such a low resistance contact is indicated.

When the circuit 33 changes state and the circuit 32 is in its quasi-stable state for the second time, an AND gate 52 opens switching off a transistor 53. The collector of this transistor goes positive generating a positive Z-modulation pulse for the oscilloscope to brighten the trace. It is at this time that a point whose position is determined by the X and Y co-ordinates becomes visible. The waveform of the bright-up pulse is shown in FIG. 5(*f*).

The bright-up pulse is suppressed if the sheet and slab are out of contact by the action of transistors 55, 56 and 57. The transistor 55 is normally conducting so that when the sheet 10 is not in good contact with the slab and the transistors 42 and 43 are not conducting, the end of the sheet connected to the collector of the transistor 43 which would otherwise 'float' is drawn negative. A long tailed pair of transistors 56 and 57 detect this negative excursion since the transistor 56 ceases to conduct and a comparatively high current is passed through the transistor 57 holding the collector of the transistor 53 near earth potential, and suppressing the Z modulation pulse. Hence the co-ordinates generated by the peak detector circuits 18 and 19 only cause a visible trace on the oscilloscope screen if the sheets 10 and 11 are in contact.

In addition, when the transistor 57 conducts heavily the input to the inverter 34' is held at zero and the second cycles of the monostable circuits 31 and 32 and prevented.

In order to allow the Y co-ordinate to be read, the transistor 55 is switched off while the monostable circuit 32 is in its quasi-stable state for the first time. Under these conditions an AND gate 54 opens applying a negative potential to the base of the transistor 55.

An arrangement which is in many respects similar to that of FIG. 4 may be used to provide a digital output for example for a computer. In this case the clock pulse generator 30 is not required since clock pulses can be obtained from the computer. Other timing pulses for switching the transistors 35 and 39, the contact detector (that is the transistors 55, 56 and 57), and the clamp circuits can also be obtained from the computer. The outputs from the peak detector circuits may be time multiplexed to an analogue-to-digital converter (not shown) again under the control of the computer.

The contact detector may be coupled to the computer to suppress co-ordinates generated when the sheets 10 and 11 are not in contact. Where a punched paper tape is produced to record a display, the contact detector may ensure that, whenever the sheet and slab are not in contact, a hole is punched in a special position with reference to the holes representing a pair of co-ordinates, indicating that the co-ordinates are not valid.

Instead of using the separator 20 in the form of a cloth or mesh the space between the sheet and the slab may be filled with a liquid, or a liquid gel. Transparent oil having molecules of long chain polymers is suitable, as is a thixotropic material. Instead a mechanical separator such as an insulating mesh may be used between the sheet and the slab.

The separator may also be fabricated by screen printing a matrix of insulating islands on one of the resistance layers.

In another form the separator may be formed by replacing the slab 11 by a conductive sheet embossed to form ridges or islands. Insulation is then plated or coated on the high parts of the embossed sheet. In operation a point formed in the sheet 10 can reach between the ridges or islands to make contact but a larger deformation cannot make contact.

In yet another form the separator may be a large number of very small glass or PTFE balls.

It will be clear that the invention may be put into practice in many other ways than those specifically described. For example the invention may be used to indicate points on a display. In this case the flexible sheet is a transparent material such as nichrome on mylar and the resistive member is a stannous oxide film on glass. The sheet and the resistive member may then be fixed in front of the display, for example the screen of an oscilloscope, which is viewed through the sheet and member.

A further embodiment of the invention, providing a series of digitised co-ordinates, will now be described.

In FIG. 6, the resistive sheet 10 and the slab 11 are again connected through switches 16 and 16' to a power supply. The switches 16 and 16' may of course be transistors as in FIG. 4 but they are shown as simple switches in FIG. 6. The sheet 10 is connected to the peak detector circuit 18 and the slab 11 is connected to a peak detector circuit 19.

The circuit of FIG. 6 is under the control of three binary counters 65, 66 and 67. Clock pulses from a clock pulse generator 68 reach the counters 65 and 66 by way of an AND gate 69 and a seven stage binary counter 70. When the counters 65, 66 and 67 are in a predetermined one of their two states they are designated in this specification as being in the states A, B and C, and when these counters are in the other of their predetermined states the conditions are designated $\overline{A}$, $\overline{B}$ and $\overline{C}$. These states are marked on FIG. 6 in positions where they represent the enabling signals for gates and the operation of switches. The switches operate in the directions shown by the arrows when the relevant condition is present.

The waveforms of a single cycle of the operation of the circuit of FIG. 6 are shown in FIG. 7 where the waveforms 71, 72 and 73 represent the states of the counters 65, 66 and 67, respectively. The condition which exists for each portion of waveform is also shown.

At the start of the cycle of operation to be described, the AND gate 69 is open since an AND gate 74 is closed, as will be explained later, and the conditions A and B are not present to open an AND gate 75. It should be noted that in FIGS. 6 and 8 a circle containing the symbol I represents an inverter, one such inverter being shown at 76. Thus clock pulses pass through the gate 69 to the seven stage counter and eventually to the counter 65. Taking the part of the cycle in which the counter 65 has just entered the A state but the counters 66 and 67 are sill in the $\overline{B}$ and $\overline{C}$ states respectively, it will be seen that the slab 11 is connected to the power supply and that the peak detector circuit 18 is sampling a voltage representative of the Y co-ordinate. At the same time the peak detector circuit 19 is clamped to earth by way of a switch 76. A negative voltage applied at a terminal 77 is disconnected from the sheet 10 since a switch 78 is open. The voltage applied at the terminal 77 gives a means, as will be described later, of suppressing the output when a poor contact or no contact at all exists between the sheet 10 and the slab 11.

Since clock pulses continue to pass through the gate 69, the counter 66 changes to its B state and the counter 65 reverts to its $\bar{A}$ state. In this condition the switches 16 and 16' connect the sheet 10 to the power supply and a voltage representing the X co-ordinate is picked off by the peak detector circuit 19. The clamp applied to this circuit by the switch 76 has been removed, and the peak detector circuit 18 is connected through a switch 80 to an integrator circuit 81 formed by an operational amplifier and a capacitor connected in parallel. While the circuit is in the state $\bar{A}$, B, $\bar{C}$ the integrator 81 charges at a rate proportional to the output voltage of the peak detector circuit 18. At the same time the switch 78 has now closed applying a negative voltage to the sheet 10. If a poor contact exists between the sheet 10 and the slab 11, a comparator 82 senses that its input voltage is below zero and enables an AND gate 83. The condition $\bar{C}$ is also present and thus a bistable circuit 84 is set.

The counters 65 and 66 now move into their next state so that the conditions A, B and $\bar{C}$ exist in the circuit. The integrator 81 has a reference voltage applied to it by way of a switch 85 and consequently it discharges towards this reference voltage. During this time clock pulses reach the seven stage binary counter 70 which since it has just overflowed to the counter 65 is empty at the beginning of this interval. As soon as the integrator output has fallen to zero as indicated by a comparator 86, the AND gate 75 opens thereby closing the AND gate 69 and preventing further clock pulses reaching the counter 70. An AND gate 87 is now enabled since it is assumed that the external ready signal is applied and an AND gate 88 is opened since the condition C is not present to open an AND gate 89 and an output buffer register 90 receives a load signal. As a result the seven digits in the counter 70 which represent a digitisation of the Y co-ordinate to 127 intervals are transferred to the output buffer register 90. Opening the gate 87 also resets the counters 65 and 66. The binary zero now in the counter 67 is also loaded as the eighth digit and this counter takes up the C state.

The gate 69 is now enabled to allow clock pulses to reach the counters 65 and 66 so that the circuit enters the state $\bar{A}$, B, C and a switch 79 connects the peak detector circuit 18 to the integrator circuit 81. During the next interval when the condition is A, B, C the integrator 81 is again discharged by way of the switch 85 and the counter 70 accumulates clock pulses until the comparator 86 indicates that the output of the integrator 81 has reached zero, when the gate 75 opens preventing further clock pulses reaching the counter 70. The gate 87 opens but the gate 88 only opens if the gate 89 remains closed, that is, if a good contact has allowed the bistable 84 to remain in its reset state. If the gate 88 opens the buffer register 90 is loaded from the counter 70, and a one is loaded as eighth bit from the counter 67. However if the gate 88 does not open the buffer 90 is not loaded. Thus a succession of eight bit characters with eighth bit zero, that is Y co-ordinates only indicates poor contact between the sheet and slab, while when the eighth bit is one the indication is that contact is good and an X co-ordinate is present.

During the condition ABC a switch 93 is closed clamping the peak detector 19 to ground. This switch is also operated by a "ready" signal at the start of operation. When the gate 87 opens it resets the counters 65 and 66, and when the eighth bit is loaded the counter 67 reverts to the $\bar{C}$ state.

The cycle of operation is then repeated.

A monostable circuit 91 is provided to ensure that a given sample rate is not exceeded. When the condition $\bar{A}$, B, C exists the monostable circuit 91 is set to its unstable state and in this condition an AND gate 92 is opened. Should the condition A, $\bar{B}$, $\bar{C}$ now arise before the monostable circuit has returned to its stable state, the gate 74 will open preventing clock pulses from being passed through the gate 69 to the counters 65, 66 and 70.

The output from the circuit of FIG. 6 can be used as the input to a computer for such purposes as, for example, the validation of signatures, provided the necessary computer program is available. It can also be used for display on some devices which require analogue voltages representative of X and Y co-ordinates such as for example an oscilloscope. However, in this role it is preferable to use the circuit of FIG. 8 since in this way instead of displaying a series of illuminated dots a continuous display can be obtained.

The circuit of FIG. 8 is under the control of two counters 100 and 101. Each counter has two states and in one of these states the counters 100 and 101 set up the conditions P and Q, respectively, and in the other of these states the counters set up the conditions $\bar{P}$ and $\bar{Q}$ respectively.

As has been mentioned, the output from the circuit of FIG. 6 consists of a series of eight bit characters representing Y co-ordinates only if a poor contact between the sheet and slab exists, or pairs of co-ordinates Y followed by X for good contact conditions, each co-ordinate being digitised into 127 intervals. The presence of an eighth bit which is a one indicates that writing is in progress and marks the X co-ordinate.

The digits from the circuit of FIG. 6 are received in parallel over a seven line channel 102 and passed to an eight stage counter 103. The eighth bit from each co-ordinate is received through a single line channel 104. While the eighth bit is a zero the counter 103 is continually loaded since the channel 104 is connected to the load terminal of the counter 103 by way of an inverter 105. Thus the counter 103 acts as a buffer when characters with eighth bit equal to zero are received, the characters being continually overwritten in the counter 103.

Since the eighth bit is absent the inverter 105 applies a load signal to a counter 106. This counter is connected to receive the previous Y co-ordinate value from a counter 107, so that this current value is transferred to the counter 106.

As soon as an eighth bit which is a one is received, a clock pulse generator 108 provides pulses for a seven stage counter 110. At the same time an AND gate 111 is opened by the eighth bit since the counters 100 and 101 are at this time in the $\bar{P}$ and $\bar{Q}$ states. The gate 111 is now open, a counter 112 is loaded from the channel 102 with the X co-ordinate and a counter 113 is loaded from a counter 114 with the previous X co-ordinate.

When 128 clock pulses have been generated the counter 100 changes to its P state and the condition is now P, $\overline{Q}$. In this condition a gate 115 opens passing clock pulses to both the counters 103 and 106. These pulses continue until both of these counters have overflowed when a gate 116 is opened closing the gate 115. One of the counters 103 and 106 now contains zero and the other contains the difference between the numbers formerly held by these counters, that is the difference between the current co-ordinate and the previous co-ordinate. If the counter 103 contains the difference then the current Y co-ordinate is greater than the previous co-ordinate, on the other hand if the counter 106 contains the difference then the current X co-ordinate is smaller than the previous Y co-ordinate. Meanwhile a similar operation is being carried out with the counters 112 and 113 so that when they have both overflowed one of them contains the difference between the current and previous X co-ordinates. Clock pulses reach the counters 112 and 113 by way of an AND gate 117 and this gate is inhibited when both counters have overflowed by an AND gate 118.

Since clock pulses are still reaching the counters 100 and 101 the conditions now change to $\overline{P}$, Q and an AND gate 120 opens passing clock pulses to rate multipliers 121 -124 connected for parallel readout from the counters 103, 106, 123 and 124, respectively. A rate multiplier is a known circuit which passes a number of pulses equal to, or an integral multiple of, a number applied thereto from a register. For example if the counter 103 contains the difference between the current and previous Y co-ordinates then the rate multiplier will pass a number of clock pulses equal, in this case, to twice the said difference. The pulses at the outputs of the rate multipliers 121 and 122 are applied to count up, and count down, respectively, the number in the counter 107. Similarly pulses from the rate multipliers 123 and 124 are applied to count up, and count down, respectively, the X co-ordinate in the counter 114. In this way the current X and Y co-ordinates are updated in the registers 114 and 107. Since, in this embodiment, the rate multipliers 121 – 124 multiply the number applied to them by two, the least significant stages of the registers 107 and 114 are connected only to digital to analogue converters 125 and 126, respectively. The other stages of the counter 107 are connected both to the counter 106 and the digital to analogue converter 125. Similarly the other stages of the counter 114 are connected both to the counter 113 and the converter 126. Thus the converters 125 and 126 provide analogue signals representative of the current Y co-ordinate and the current X co-ordinate and as these co-ordinates are updated so the point giving the display moves to provide a continuous line as long as, for an oscilloscope, the bright-up signal is applied to the tube. Of course in other types of display a similar enabling signal to the bright-up signal can be provided.

The eighth bit for both the X and Y co-ordinates are applied through the channel 104 to a three-stage shift register 127 so that this register only gives an enabling signal for an AND gate 128 if the present pair of X and Y co-ordinates and the previous pair of X and Y co-ordinates contained eighth bits which were ones indicating that the stylus has been continually pressed on the sheet 10. The gate 128 also receives an enabling signal from an OR gate 129 which is open if any of the rate multipliers 121 - 124 is transmitting clock pulses. Since the output of the AND gate 128 controls the bright-up of the oscilloscope, it will be seen that the trace is only visible if the rate multipliers are up-dating the converters 125 to 126 and if the stylus has been kept in contact with the sheet 10.

I claim:

1. Apparatus for obtaining signals indicative of the co-ordinates of a point indicated on a surface, including a continuous sheet held parallel and adjacent to, but not in contact with the continuous planar surface of a member, the sheet and the member comprising electrically resistive material, the sheet being of such material and so mounted that it is able to make contact temporarily with the planar surface over a relatively small area when pressed towards the surface by means for indicating the position of a point, means positioned between the sheet and the planar surface to prevent contact between the sheet and the surface over relatively large areas, change-over means for causing current supplied to the apparatus to flow alternately in two paths; a first path in which the current flows in a substantially single direction through the sheet, and a second path in which the current flows in a substantially single direction, at an angle to the other current direction, through the resistive member, and means for deriving a first signal giving the value of the voltage of the resistive member when current flows in the sheet and a second signal giving the value of the voltage of the sheet when current flows through the resistive member, the first and second signals being representative of first and second co-ordinates of the point, respectively.

2. Apparatus according to claim 1 including suppression means for detecting good contact between the sheet and the member and for suppressing the output of the apparatus unless a good contact exists.

3. Apparatus for obtaining the co-ordinates of a point indicated on a surface, including a sheet of electrically resistive material held parallel and adjacent to, but not in contact with the planar surface of an electrically resistive member, the sheet being sufficiently resilient to deform temporarily and make contact with the planar surface over a relative small area, when pressed by means for indicating the position of a point, change-over means for coupling current-supply means to pass a current in a substantially single direction through the sheet, and for coupling measuring means to the resistive member, and for subsequently coupling the current-supply means to pass a current in a substantially single direction, at an angle to the other current direction, through the resistive member, and for coupling the measuring means to the sheet, the measuring means being so adapted to measure voltage when the sheet and the member are in contact at the said area that the voltages at the area due to the said currents are provided one after another, and suppression means for detecting good contact between the sheet and the member and for suppressing the output of the apparatus unless a good contact exists.

4. Apparatus according to claim 3 including means positioned between the sheet and the planar surface to prevent contact between the sheet and the surface over relatively large areas.

5. Apparatus according to claim 4 wherein the sheet extends over a rectangular area between first and second parallel electrodes of conducting material and the resistive member extends over a rectangular area between third and fourth parallel electrodes of conducting material, the first and second electrodes being at right angles to the third and fourth electrodes, the sheet being connected to the change-over means by way of the first and second electrodes, and the resistive member being connected to the change-over means by way of the third and fourth electrodes.

6. Apparatus according to claim 5 wherein the sheet of electrically resistive material is a sheet of resilient resistive material.

7. Apparatus according to claim 5 wherein the sheet of electrically resistive material is a layer of resistive material which is mounted on a sheet of resilient insulating material.

8. Apparatus according to claim 7 wherein the sheet is made of carbon loaded plastics material.

9. Apparatus according to claim 7 wherein the sheet is made of conducting silicone rubber and is mounted on glass cloth.

10. Apparatus according to claim 5 wherein the resistive member is a layer of resistive material which is mounted on insulating material.

11. Apparatus according to claim 5 wherein the change-over means includes first and second change-over switches, each having a common terminal, and first and second terminals either of which can be connected by operating the switch to the common terminal, the common terminals of the switches being connected to the terminals of direct-current supply means, the sheet being connected between the first terminals of the switches, and the resistive member being connected between the second terminals of the switches.

12. Apparatus according to claim 5 wherein the change-over means includes means for applying an alternating current to a first series circuit comprising the sheet and first rectifier means, and a second series circuit comprising the member and second rectifier means, the first and second rectifier means being oppositely poled with the result that the sheet and the member pass current for alternate half cycles of the alternating current.

13. Apparatus according to claim 5 wherein the change-over means includes a first switching circuit comprising first and second transistors with their emitter-collector paths connected in series with the sheet, and a second switching circuit comprising third and fourth transistors with their emitter-collector paths connected in series with the resistive member, and control means for causing the first and second transistors to conduct together and alternately with the third and fourth transistors conducting together.

14. Apparatus according to claim 5 wherein the measuring means includes first and second peak detector circuits which are connected to the sheet and the resistive member respectively.

15. Apparatus according to claim 5 wherein the suppression means includes switching means for periodically connecting a part of the sheet or resistive member to a reference-potential source of potential outside the potential limits of the current supply means, when current is not being passed through the sheet or resistive member, respectively, and means for comparing the potential at the said part with the potential of the reference source to indicate that the sheet and resistive member are out of contact if the potential difference between the part and the reference source is less than a predetermined value.

16. Apparatus according to claim 15 wherein one end of the sheet or the resistive member is connected to a pair of transistors, one transistor forming part of the change-over means and when conducting connecting the said end to a terminal of a current supply, and the other transistor when conducting connecting the said end to a terminal of a reference-voltage source whose voltage is of the same polarity but greater than that of the current supply terminal, the transistors of the pair being arranged to conduct at different times, and the means for comparing potentials being connected to the said one end.

17. Apparatus according to claim 15 for providing voltages for an oscilloscope to allow a display corresponding to movement of the point indicated, wherein the change-over means includes a first switching circuit comprising first and second transistors with their emitter-collector paths connected in series with the sheet, and a second switching circuit comprising third and fourth transistors with their emitter-collector paths connected in series with the resistive member, and control means for causing the first and second transistors to conduct together and alternately with the third and fourth transistors conducting together the measuring means includes first and second peak detector circuits which are connected to the sheet and the resistive member respectively, means for providing a signal when the oscilloscope trace is to be visible, and means for clamping the outputs of the peak detectors to zero are provided, and the control means provides a cycle of operation in which firstly the outputs of the peak detectors are released from clamping, secondly current is passed through whichever of the sheet or the resistive member includes the said part, thirdly the said part and the reference potential source are disconnected while current is passed through whichever of the sheet or the resistive member did not pass current, fourthly the said part is reconnected to the reference-potential source, and fifthly if there is contact between the sheet and the resistive member the signal indicating that the oscilloscope trace is to be brightened is provided.

18. Apparatus according to claim 5 wherein the means for preventing contact between the sheet and the surface over relatively large areas include a liquid or a liquid gel contained between the sheet and the surface.

19. Apparatus according to claim 5 wherein the means for preventing contact between the sheet and the surface over relatively large areas include a grid of insulating material between the sheet and the surface.

20. Apparatus according to claim 5 wherein the means for preventing contact between the sheet and the surface over relatively large areas include a matrix of islands of insulating material between the sheet and the surface.

21. Apparatus according to claim 5 wherein the measuring means includes first and second peak detector circuits which are connected to the sheet and the resistive member, respectively, and the apparatus includes integrator means, comparator means for indicating when the content of the integrator means has reached a predetermined value during readout, means for allowing clock pulses from a generator to reach a counter only while the integrator content is being reduced and before the comparator indicates that the integrator content has reached the predetermined value, and selection means for connecting the integrator means to carry out the following sequence of operation cyclically, firstly, connect that peak rectifier circuit connected to the resistive member to the input of the integrator means, secondly, connect the integrator means to means for reducing its content at a constant predetermined rate, thirdly, connect that peak rectifier connected to the sheet to the integrator means, and fourthly connect the integrator means to the means for reducing its content, whereby the counter receives pairs of trains of pulses, the value represented by the pulses of one train in each pair being the current value of one co-ordinate, and the value represented by the pulses of the other train in each pair being the current value of the other co-ordinate.

22. Apparatus according to claim 21 including means for adding a marker signal to each pair of pulses indicating whether the sheet and resistive member are in good contact with one another.

23. Apparatus according to claim 22 including second and third counters for holding the current and preceding values of one co-ordinate, respectively, fourth and fifth counters for holding the current and preceding values of the other co-ordinate, respectively, first and second difference means for finding the differences between the current and preceding values of the said one and the said other co-ordinates, respectively, logic means for activating the first and second difference means only if the said marker signal indicates that the sheet and resistive member were in contact when the current co-ordinates were generated, means for updating the third and fifth counters in accordance with output signals from the difference means, and first and second digital to analogue converters for providing analogue output signals representative of the contents of the third and fifth counters, respectively.

24. An apparatus for obtaining signals representative of the co-ordinates of a point indicated on a surface, including a continuous sheet held parallel and adjacent to, but not in contact with the continuous planar surface of a member, the sheet and the member comprising electrically resistive material, the sheet being sufficiently resilient to deform temporarily and make contact with the planar surface over a relatively small area, when pressed by means for indicating the position of a point, means positioned between the sheet and the planar surface to prevent contact between the sheet and the surface over relatively large areas, change-over means for coupling current-supply means to pass a current in a substantially single direction through the sheet without substantial current being passed through the resistive member, and for subsequently coupling the current-supply means to pass a current in a substantially single direction, at right angles to the other current direction, through the resistive member without substantial current being passed through the sheet, and means for deriving a first signal giving the value of the voltage of the resistive member when current flows in the sheet and a second signal giving the value of the voltage of the sheet when current flows through the resistive member, the first and second signals being representative of first and second co-ordinates of the point, respectively.

* * * * *